United States Patent [19]

Krutz et al.

[11] 4,037,687
[45] July 26, 1977

[54] LUBRICATING MEANS FOR THE TRANSMISSION GEAR OF A SHIP

[75] Inventors: Wolfgang Krutz, Monchengladbach; Hans Steinberg, Witten, both of Germany

[73] Assignee: Lohmann & Stolterfoht A.G., Witten, Germany

[21] Appl. No.: 685,236

[22] Filed: May 11, 1976

[30] Foreign Application Priority Data

June 10, 1975 Germany .............................. 2526139

[51] Int. Cl.² ............................................. F01M 1/18
[52] U.S. Cl. ..................................... 184/6.4; 417/223
[58] Field of Search ................ 184/6.4, 6.28; 417/223; 415/18

[56] References Cited

U.S. PATENT DOCUMENTS

| | | | |
|---|---|---|---|
| 1,647,135 | 11/1927 | Johnson | 184/6.4 |
| 2,155,218 | 4/1939 | Cain | 184/6.4 |
| 2,464,144 | 3/1949 | McConaghy | 415/18 |
| 2,871,981 | 2/1959 | Baits | 184/6.4 |
| 3,540,550 | 11/1970 | Bailey | 184/6.4 |
| 3,837,430 | 9/1974 | Decker et al. | 184/6.4 |
| 3,961,859 | 6/1976 | Cygnor et al. | 417/223 |

Primary Examiner—Samuel Feinberg
Attorney, Agent, or Firm—Cullen, Settle, Sloman & Cantor

[57] ABSTRACT

Lubricating means for the transmission gear of a ship having a lubricating oil sump and a driven shaft, at least one lubricating oil pump having an intake connected to said sump and a delivery pipe connected to said transmission gear, an electric motor driving said pump and a ship electric supply system connected to said motor. The improvement comprises an additional lubricating oil pump having a drive shaft, a suction pipe connected to said sump and a delivery pipe. A clutch is interposed between said additional pump drive shaft and the transmission driven shaft. A branch pipe is interposed between said supply pipe and said clutch and transmission gear with normal pressure maintaining said clutch disengaged. A fall in pressure in the main lubricating oil supply pipe permitting engagement of said clutch kinematically-connecting said driven shaft to said auxiliary pump drive shaft to drive said additional pump. A tank is supported above said transmission gear and said additional pump delivery pipe outlets into said tank. A series of gravity feed lubricating pipes are interposed between said tank and said transmission gear. A valve is connected to each of said pipes and to said electric supply system; said valves being respectively opened and closed with the failure of the ship's electric supply system, for maintaining lubrication to said transmission gear.

6 Claims, 1 Drawing Figure

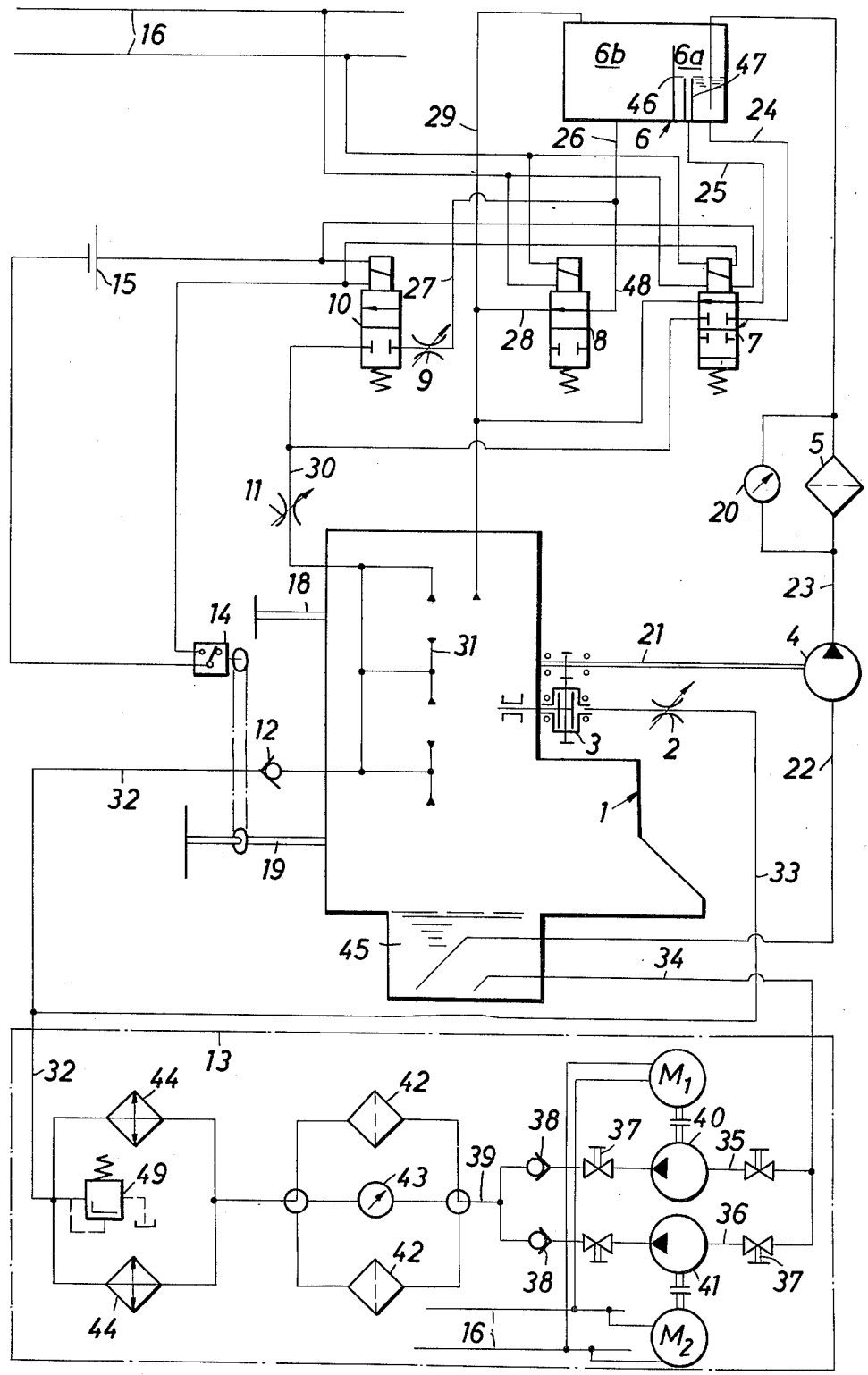

LUBRICATING MEANS FOR THE TRANSMISSION GEAR OF A SHIP

BACKGROUND OF THE INVENTION

The invention relates to a lubricating means for the transmission gear of a ship, comprising at least one lubricating oil pump, which is driven by an electric motor fed by the ship's supply system.

A satisfactory supply of lubricating oil is an important means of guaranteeing a steady and smooth running of the transmission gear of a ship; however, since the supply of lubricating oil is by way of suitable electrically driven lubricating oil pumps, there is the danger of the supply of lubricating oil being interrupted with a current failure, a so-called "black-out", and this leads to damage to the transmission gear. Although a failure in the main supply system and the interruption in the supply of lubricating oil associated therewith usually only lasts a short time until a suitable emergency supply unit is started, it is still necesssary to ensure that the lubricating oil supply is assured, even for this short time

SUMMARY OF THE INVENTION

The invention has for its object to find a solution for this problem, and in fact a solution which does not require any additional energy source for delivering the oil which is required during the failure of the main supply system.

According to the invention, therefore, it is proposed that an additional lubricating oil pump is provided and is kinematically connected to the driven shaft of the transmission gear through a clutch which is engaged by a fall in pressure in the main lubricating oil supply, the suction pipe of the additional lubricating oil pump being connected to the lubricating oil pump of the transmission gear and its pressure or delivery pipe being connected to an overhead tank, and that valves are provided in the lubricating oil gravity pipes leading from the overhead tank to the transmission gear of the ship, which valves are opened or closed, respectively, with failure of the ship's supply system.

Other developments of the invention are set out in the subsidiary claims.

The result which is obtained by the invention is that, apart from a first filling operation, there is always a small quantity of lubricating oil in the antechamber of the overhead tank, which oil quantity, with a failure of the main supply system and with the opening of the corresponding valve which is connected therewith, is able to flow into the transmission gear of the ship for the lubrication thereof. Simultaneously, by the closing of the clutch which is associated with the additional lubricating oil pump, the said pump is set in operation by the transmission gear, which possibly is slowly running down, and delivers a relatively large quantity of lubricating oil into the overhead tank, from which tank the lubricating oil is able to flow back through the gravity pipes and the corresponding valves as lubricating means for the transmission gear. It is not inconvenient that the lubricating oil pump ceases to deliver oil as soon as the transmission gear of the ship comes to a stop, since then also no more lubricating oil is necessary.

THE DRAWING

The accompanying FIGURE illustrates the invention by reference to a diagrammatic constructional example.

DETAILED DESCRIPTION OF THE INVENTION

This FIGURE shows a transmission gear 1 of a ship, the said gear being lubricated by a main lubricating oil supply which is indicated by a chain-dotted line 13. The main lubricating oil supply consists essentially of two lubricating oil pumps 40,41, which can be operated at will and which are driven by corresponding electric motors M1, M2. The electric motors M1, M2 are supplied with energy from the ships supply system 16. The suction pipes 35,36,in which are arranged valves 37, lead to a common intake pipe 34, which draws the lubricating oil from the lubricating oil sump 45 of the transmission gear 1. The pressure or delivery pipes of the transmission gear 1. The pressure or delivery pipes of the lubricating oil pumps 40,41, in which are fitted non-return valves 38, are united to form one delivery pipe 39, which leads by way of a reversible double filter 42 with differential pressure manometer 43 to two oil coolers 44 and thereafter through the delivery pipe 32, in which are provided a pressure-regulating valve 49 and another non-return valve 12, to the transmission gear 1 of the ship.

The actual transmission gear 1 is driven through a driving shaft 18 and is connected through a driven shaft 19 to the propeller shaft, which is not shown. Having a kinematic connection with the driven shaft 19 is a clutch 3, which is disengaged by oil pressure of the delivery pipe 32, to which it is connected through a control line 33 and a throttle valve 2. With a free in the pressure in the delivery pipe 32 and thus also in the control line 33, the clutch 3 is engaged and drives the driving shaft 21 of an additional lubricating oil pump 4 through suitable gears. The suction pipe 22 of the additional lubricating oil pump 4 takes the lubricating oil from the lubricating oil sump 45. The delivery pipe 23 of the additional lubricating oil pump 4, in which is arranged a manometer 20 and an oil filter 5, similar to the manometer 43 and the double filter 42 in the delivery pipe 39, leads to an overhead tank 6 and opens into an antechamber 6a and a larger main chamber 6b by a weir 46 over which the oil can overflow and is of such dimensions that it can accomodate somewhat more oil than is used with a normal "black-out" of lubricating oil.

Serving for the partial emptying of the antechamber 6a is an overflow pipe 47. Connected to the overhead tank 6 are a first gravity pipe 24, a second gravity pipe 25 and a third gravity pipe 26, the third gravity pipe 25 merging into the overflow pipe 47. The first gravity pipe 24 leads to a multi-way valve 7 and from the latter, via another pipe 30, through a throttle valve 11 to the transmission gear 1. The second gravity pipe 25 also leads to the multi-way valve 7 and to the transmission gear 1. The third gravity pipe 26 is divided into two branches 27,48, of which the branch associated with the pipe 27 leads via a throttle valve 10, the discharge side of which is combined with the pipe 30. The second branch, which is associated with the pipe 48, serves as an emptying pipe for the overhead tank 6 and leads via a valve 8 and a pipe 28 to the transmission gear 1.

The valve 8 connected to the ship's supply system 16, while the valve 7 is connected to the ship's supply system 16 and also to the auxiliary current source 15, and the valve 10 is connected only to the auxiliary current source 15. The circuit of the auxiliary current source can be closed by a switch 14, the switch 14 being actuated by a revolution counter of the driven shaft 19.

The function of the emergency lubrication system can be described substantially as follows:

With a failure of the ship's system 16, the clutch 3, which is disengaged hydraulically and is engaged by spring force, is closed as the lubricating oil pressure of the the main lubricating oil supply 13 falls, whereby the additional lubricating oil pump 4 is started.

At the same time, the valve 8 is closed and the multi-way valve 7 is opened, as a result of which a small supply of oil present in the antechamber 6 a can flow out. A suitable small oil supply is always present in this antechamber 6 a.

By a suitable design of the additional lubricating oil pump 4 and by a suitable setting of the throttle valve 11, the aditional lubricating oil pump 4, driven by the propeller or the driven stage of the ship's transmission gear 1, very quickly reaches a delivery quantity which is greater than that flowing back through the throttle valve 11 to the transmission gear 1. As a result, the antechamber 6a becomes filled and, by oil flowing over the weir 46. The main chamber 6b is also filled. An additional overflow pipe 29 prevents any buliding up of pressure in the overhead tank 6.

However, if the delivery quantity of the additional lubricating oil pump 4, as a result of a decreasing number of revolutions of the propeller, falls below the prescribed minimum lubricating oil consumption of the bearings in the transmission gear 1, then an electric contact 14, controlled by the revolution counter tapping on the driven shaft 19 of the gear, is closed through an auxiliary circuit associated with the auxiliary current source 15. In this case, the valve 10 is opened and connects the main chamber 6b to the lubrication points 31 in the transmission gear. The quantity of lubricating oil which is now flowing out and which can be measured by a suitable setting of the throttle valve 9 is sufficient, until the ending of the black-out. However, should the black-out only last a short time, which quite frequently happens, and should in this time already a relatively large quantity of lubricating oil have accumulated in the main chamber 6b, this oil quantity is returned into the oil sump of the transmission gear by the valve 8 opening again because of the build-up of voltage in the ship's supply system 16.

The multi-way valves are electrically switched as follows: With a supply failure (black-out) the valve 8 closes and the multi-way valve 7 (in practice, a four-way valve) is brought into the other throughflow position. However, as soon as the valve 10 opens, the multi-way valve 7 again returns to its initial position, so that a small supply of lubricating oil is maintained in the ante-chamber 6a. As soon as the voltage in the ship's supply system 16 has built up again, the circuit associated with the auxiliarly current source 15 must be automatically broken, so that the valve 10 is closed again.

Having described our invention, reference should now be had to the following claims.

We claim:

1. Lubricating means for the transmission gear (1) of a ship having a lubricating oil sump (45), and a driven shaft (19), at least one lubricating oil pump (40) having an intake (34) connected to said sump and a supply pipe (32) connected to said gear, an electric motor (M1) driving said pump, and a ship electrical supply system (16) connected to said motor; the improvement comprising:

an additional lubricating oil pump (4) having a drive shaft, a suction pipe (22) connected to said sump and a delivery pipe (23); a clutch (3) between said additional pump drive shaft (2) and the transmission driven shaft (19); a branch pipe (33) between said supply pipe (32) and said clutch (3) and transmission gear (1); with normal pressure in pipe (33) maintaining said clutch disengaged; a fall in pressure in the main lubricating oil supply pipe (32) permitting engagement of said clutch kinematically connecting said driven shaft (19) to said drive shaft (21) to drive said additional pump (4); a tank supported above said transmission gear; said additional pump delivery pipe (23) outletting into said tank; a series of gravity feed lubricating pipes (24,25,26) between said tank and said transmission gear; and a vlave (7,8,10) connected to each pipe and to said electric supply (16), said valves respectively opened and closed with the failure of the ship's electric supply system for maintaining lubrication to said transmission gear.

2. In the lubricating means of claim 1, said tank being divided into an ante-chamber (6 a) and a main chamber (6b) separated by a weir (46) over which oil can flow; a first gravity pipe (24) leading from the bottom of said ante-chamber (6 a) to said transmission gear, the corresponding valve being a multi-way valve (7) having a passage normally closed by the voltage of the main electric supply system (16) and openable on failure thereof; a second gravity pipe (26) leading from the bottom of the main chamber (6 b) to said transmission gear, the corresponding control valve (10) being normally closed; and a normally open auxiliary current source (15) connected to said valve (10), on actuation, opening said valve (10).

3. In the lubricating means of claim 2, there being an overflow pipe 47 within ante-chamber (6 a); a third gravity pipe (25) interconnecting said overflow pipe and transmission gear; and so connected to a passage through the multi-way valve (7) which is open by the voltage of the main electric supply system (16).

4. In the lubricating means of claim 2, said auxiliary current source having a circuit with a normally open switch (14) for actuating valves (7-10) arranged in said circuit, valve (7) permitting gravity oil flow from the ante -chamber (6 a) to the transmission gear (1), valve (10) permitting gravity oil flow from the main chamber (6 b) to the transmission gear; and a revolution counter means on said switch (14) and connected to the transmission driven shaft (19) for closing said switch on slowing down of said transmission drive shaft (19) for energizing said auxiliary circuit source.

5. In the lubricating means of claim 2, there being a branch pipe (48) from said second gravity pipe (26) extending to said transmission gear, one of said valves (8) being connected thereto and to said main electric supply system and normally maintained open by the voltage of said electric system, permitting drainage of said tank to said transmission gear during normal operation.

6. In the lubricating means of claim 5, said auxiliary circuit source having a circuit with a normally open switch (14) for actuating valves (7,10) arranged in said circuit; valve (7) permitting gravity oil flow from the ante-chamber (6 a) to the transmission gear (1); valve (10) permitting gravity oil flow from the main chamber (6 b) to said transmission gear; and a revolution counter-means on said switch (14) and connected to the transmission driven shaft (19) for closing said switch on slowing down of said trams,ossom drive shaft (19) for energizing said auxiliary current source.

* * * * *